(12) United States Patent
Takada et al.

(10) Patent No.: US 8,527,601 B2
(45) Date of Patent: Sep. 3, 2013

(54) SENDING APPARATUS, SENDING METHOD AND COMMUNICATION SYSTEM

(75) Inventors: Hiroaki Takada, Nagoya (JP); Ryo Kurachi, Nagoya (JP); Yukihiro Miyashita, Yokkaichi (JP)

(73) Assignees: National University Corporation Nagoya University, Nagoya-Shi (JP); Autonetworks Technologies, Ltd., Yokkaichi-Shi (JP); Sumitomo Wiring Systems, Ltd., Yokkaichi-Shi (JP); Sumitomo Electric Industries, Ltd., Osaka-Shi (JP)

( * ) Notice: Subject to any disclaimer, the term of this patent is extended or adjusted under 35 U.S.C. 154(b) by 362 days.

(21) Appl. No.: 12/733,002

(22) PCT Filed: Aug. 22, 2008

(86) PCT No.: PCT/JP2008/064995
§ 371 (c)(1),
(2), (4) Date: Feb. 2, 2010

(87) PCT Pub. No.: WO2009/025350
PCT Pub. Date: Feb. 26, 2009

(65) Prior Publication Data
US 2010/0138490 A1      Jun. 3, 2010

(30) Foreign Application Priority Data

Aug. 22, 2007  (JP) .................................. 2007-216393

(51) Int. Cl.
*G06F 15/16*     (2006.01)
(52) U.S. Cl.
USPC .......................................... 709/207; 709/232

(58) Field of Classification Search
None
See application file for complete search history.

(56) References Cited

U.S. PATENT DOCUMENTS

| 4,930,121 A | 5/1990 | Shiobara |
| 5,815,071 A * | 9/1998 | Doyle ........................... 340/439 |

(Continued)

FOREIGN PATENT DOCUMENTS

| DE | 38 51 111 T2 | 12/1994 |
| DE | 601 21 881 T2 | 8/2007 |

(Continued)

OTHER PUBLICATIONS

Office Action issued in Japanese Patent Application No. 2007-216393 dated Jul. 12, 2011 (with translation).

(Continued)

*Primary Examiner* — Moustafa M Meky
*Assistant Examiner* — Clayton R Williams
(74) *Attorney, Agent, or Firm* — Oliff & Berridge, PLC

(57) ABSTRACT

An object of the present invention is to provide a sending apparatus, sending method and a communication system with utilizing the sending apparatus that can improve efficiency of data sending operation and can reduce a duty for data communication. Each sending apparatus classifies data stored on a storage into groups "X", "Y" and "Z", fractionates a clump of data, classified into each of the groups "X", "Y" and "Z", by a number of fractions based on a sending completion allowable time for the classified data, and sends the fractionated data in multi cycles at every sending interval, without sending and receiving the data stored on the storage all at once. Each sending apparatus selects any one piece of data generated from fractionated clump of data for each of the groups "X", "Y" and "Z", and then sends the selected piece of data at every sending interval.

20 Claims, 11 Drawing Sheets

(56) References Cited

U.S. PATENT DOCUMENTS

| | | | |
|---|---|---|---|
| 2002/0046285 A1 | 4/2002 | Yasushi et al. | |
| 2004/0083044 A1* | 4/2004 | Akiyama et al. | 701/48 |
| 2006/0247832 A1* | 11/2006 | Taki | 701/33 |
| 2008/0056192 A1* | 3/2008 | Strong et al. | 370/331 |

FOREIGN PATENT DOCUMENTS

| | | |
|---|---|---|
| JP | A-1-157143 | 6/1989 |
| JP | A-04-167795 | 6/1992 |
| JP | A-06-189377 | 7/1994 |
| JP | A-2001-134301 | 5/2001 |
| JP | A-2002-099458 | 4/2002 |
| JP | A-2005-159568 | 6/2005 |
| WO | WO 2007/043608 A1 | 4/2007 |

OTHER PUBLICATIONS

International Search Report issued in Application No. PCT/JP2008/064995 on Sep. 30, 2008.

Feb. 24, 2012 German Office Action issued in German Patent Application No. 11 2008 002 252.6 (with translation).

\* cited by examiner

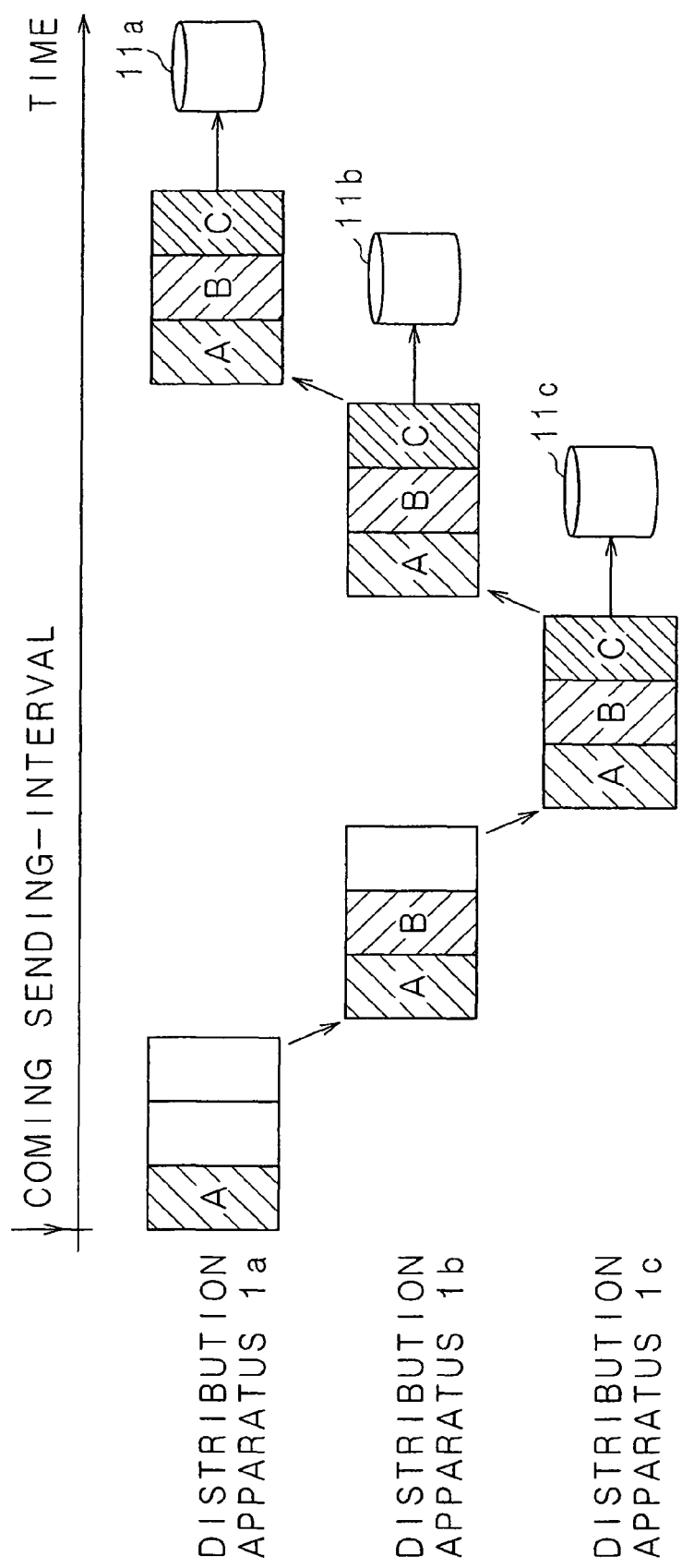

FIG. 4A

| DATA | DELAY ALLOWABLE TIME(MILLISECONDS) | GROUP |
|---|---|---|
| DATA 1 | 500 | X |
| DATA 2 | 500 | X |
| DATA 3 | 600 | X |
| ... | ... | ... |
| DATA 21 | 1000 | Y |
| DATA 22 | 1200 | Y |
| DATA 23 | 1500 | Y |
| ... | ... | ... |
| DATA 61 | 3000 | Z |
| DATA 62 | 3600 | Z |
| ... | ... | ... |

FIG. 4B

| GROUP | X | Y | Z |
|---|---|---|---|
| DELAY ALLOWABLE TIME | 500 | 1000 | 3000 |
| NUMBER OF DATA | 20 | 35 | 45 |

F I G. 5
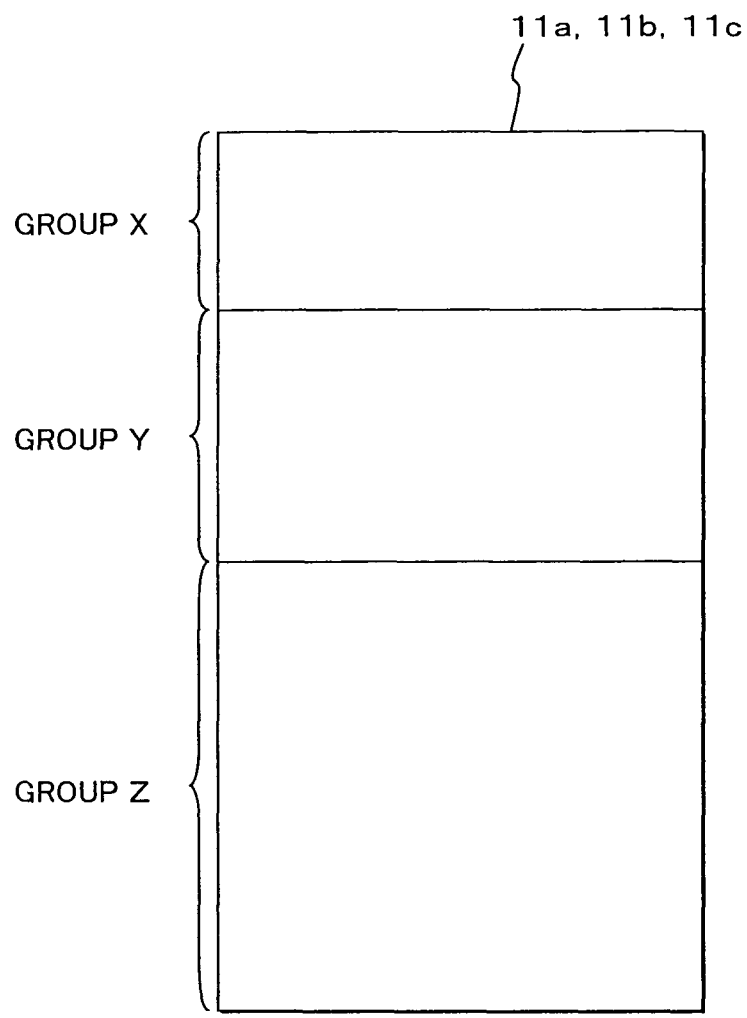

F I G. 8

| GROUP | X | Y | Z |
|---|---|---|---|
| DELAY ALLOWABLE TIME | 500 | 1000 | 3000 |
| NUMBER OF DATA | 20 | 35 | 45 |
| NUMBER OF FRACTIONS | 1 | 3 | 10 |
| NUMBER OF DATA TO BE READ OUT | 20 | 12 | 5 |

F I G. 1 0
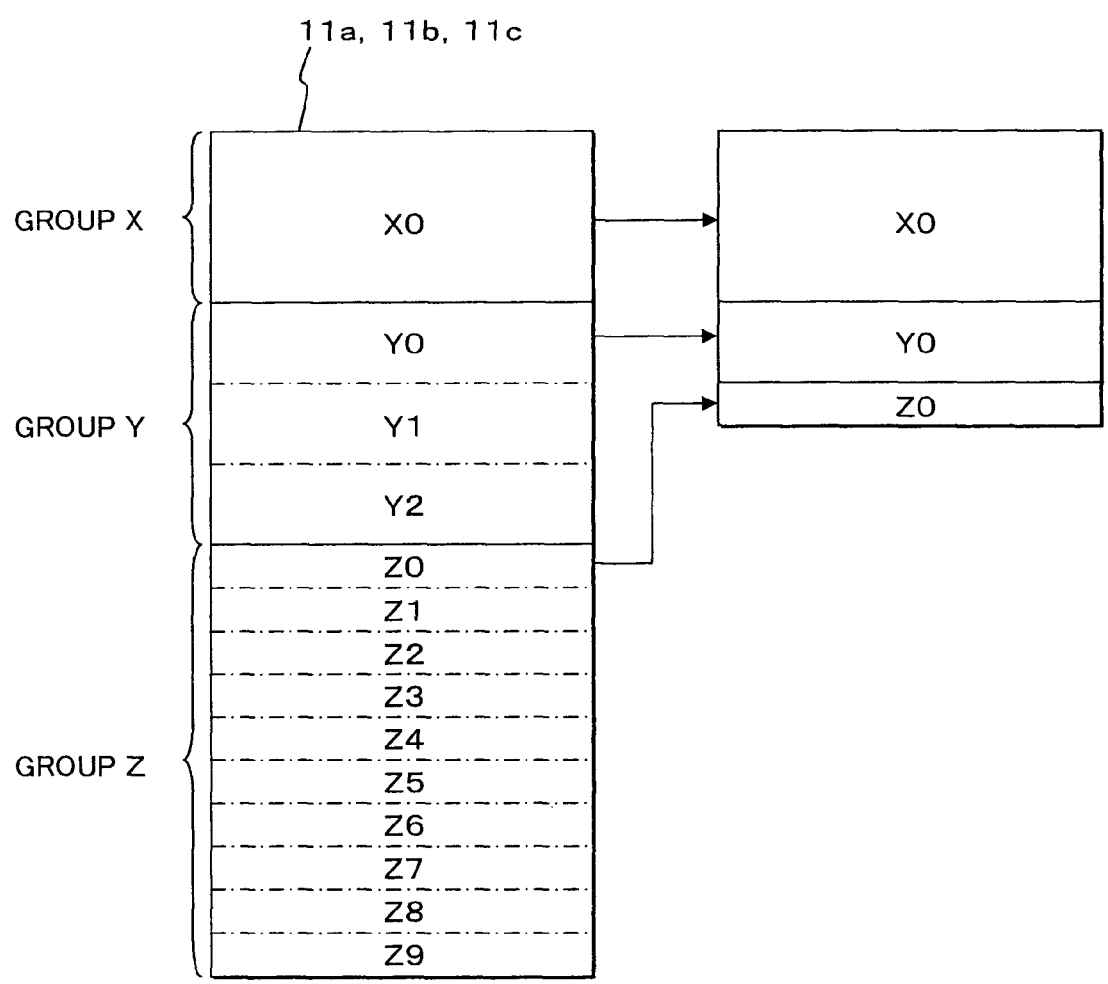

ved the United States of America.

SENDING APPARATUS, SENDING METHOD AND COMMUNICATION SYSTEM

This application is the national phase under 35 U.S.C. §371 of PCT International Application No. PCT/JP2008/064995 which has an International filing date of Aug. 22, 2008 and designated the United States of America.

BACKGROUND OF THE INVENTION

1. Field of the Invention

The present invention relates to a communication system that sends and receives data among apparatuses which store data obtained from a plurality of communication apparatuses and that synchronizes contents of data stored by the apparatuses. Especially, the present invention relates to a sending apparatus, sending method and a communication apparatus utilizing such a sending apparatus that can improve efficiency of data sending operation and can reduce a duty for data communication.

2. Description of Related Art

It is recently known in several fields to utilize a system having many communication apparatuses, in which each communication apparatus is provided with a certain function and connected with other communication apparatuses in order to perform many operations through data exchange between many communication apparatuses. For example, it is known in a field of local area network (LAN) mounted on a motor vehicle to utilize electronic control units (ECUs) as the communication apparatuses, to make each ECU perform a certain operation and to exchange data between the ECUs, in order to provide many functions to be implemented by a system.

A number and a type are increased of the communication apparatuses connected to a communication medium in a system, proportionally to a specializing degree of the function provided to each communication apparatus, as well as an increasing degree of the functions performed by each communication apparatus. Furthermore, the system is expected to perform much more various functions. Thus, each communication apparatus is required to share data and to interact with other communication apparatuses. Then, it results in an increase of exchanged data amount.

To accommodate the increase of exchanged data amount, communication apparatuses of the system is generally divided into some groups, and then each group is connected to a communication medium, respectively. Thus, a number of communication apparatuses connected to the communication medium is reduced. Therefore, it is possible to reduce a communication amount and to avoid, for example, data collisions. Furthermore, it is thought to focus on data type treated by the groups of communication apparatus, and then to connect each group to each of communication mediums respectively having different communication speed. In such a configuration, a communication apparatus is connected with another communication apparatus, by a gateway apparatus that relays data transmission.

A patent document 1 discloses that: ECUs in a field of LAN mounted on a motor vehicle are divided into some groups; each group is connected to each of communication lines mounted on the motor vehicle; the communication lines are connected to each other by a gateway apparatus; priority information is added to the received and the sent data to recognize data priority; the data priority is recognized through the priority information and the data having high priority is preferentially sent and received when the gateway apparatus performs data transmission between different communication lines, to prevent a transmission delay of data having high priority even when the communication lines take increased duty for data transmission.

[Patent document 1] Japanese Patent Application Laid-Open No. 2005-159568

SUMMARY OF THE INVENTION

Assume a case that communication apparatuses are divided into some groups and communication apparatuses of each group are connected to communication apparatuses of another group with a gateway apparatus. If the gateway apparatus sends data from a communication apparatus divided into a group to another communication apparatus divided into another group for every operation sending data from the communication apparatus to said another communication apparatus, it is not possible to reduce a duty for data communication among the communication apparatuses.

Thus, it may be thought about configuration that a plurality of sending apparatuses are provided, each of which once stores data sent from each communication apparatus and further sends the data to another communication apparatus, and that data stored by each sending apparatus are synchronized cyclically among the sending apparatuses. In such a configuration, it is possible to send stored data from each communication apparatus, at an efficient timing or with an efficient data combination. Furthermore, it is not required directly transferring data sent from each communication apparatus, in such a configuration. Therefore, it may be possible to reduce a duty for data communication.

In such a configuration, a frequency of requiring predetermined data or a frequency of updating the predetermined data may be different in accordance with a type of the predetermined data among the communication apparatuses. Thus, even when all data are sent and received among the sending apparatuses in order to synchronize data, some data may not be updated or may not be utilized.

The present invention was made in view of such circumstances, and has a primary object to provide a sending apparatus, sending method and a communication system utilizing the sending apparatus that can efficiently exchange data and can reduce a duty for data communication, by making a group for each data type, classifying stored data into groups based on data type, further fractionating data of each group, and sending the fractionated data.

Another object of the present invention is to provide a sending apparatus that can reduce a duty for data communication and can send data efficiently, by sending data configured from an optimized data unit that is determined to keep a completion time for sending data of each group being under an allowable time.

A sending apparatus of a first aspect according to the present invention is a sending apparatus having a storage means for storing a plurality of data and a means for externally sending data stored by the storage means at a predetermined sending interval, comprising: a classification means for classifying data stored by the storage means into a plurality of groups; a fraction means for fractionating data of each group: and a selection means for selecting divided data of each group at every said sending interval, wherein data selected by the selection means is sent.

In a sending apparatus of a second aspect according to the present invention, the selection means selects the divided data of each group cyclically.

A sending apparatus of a third aspect according to the present invention is a sending apparatus comprising: a means for determining a number of fractions for fractionating data of each group, with keeping a total time of sending intervals based on the number of fractions and a total time of sending delay expected time to be under a sending completion allowable time previously set for each group.

A sending method of a fourth aspect according to the present invention is a data sending method from a sending apparatus to another sending apparatus at a predetermined sending interval with a plurality of sending apparatuses, each of which has a storage means for storing a plurality of data, wherein each sending apparatus performs the operations of classifying data stored by the storage means into a plurality of groups; fractionating data of each group; selecting fractionated data for each group at every said sending interval; and sending selected data.

A communication system of a fifth aspect according to the present invention is a communication system, comprising a plurality of sending apparatuses, each of which has a storage means for storing a plurality of data and a sending means for sending data stored by the storage means, periodically sends and receives data stored by the storage means to and from another sending apparatus at a predetermined sending interval to synchronize data contents stored by each storage means, wherein each sending apparatus comprises: a classification means for classifying data stored by the storage means into a plurality of groups; a fraction means for fractionating data of each group: and a selection means for selecting divided data of each group at every said sending interval, and data selected by the selection means is sent.

According to the present invention, data stored by a storage means are classified into groups, and data classified into each group is fractionated. At every sending interval, fractionated data in each group is selected and sent from data stored by the storage means. Data of each group is completed to be sent at the time over a number of fractions×sending intervals.

According to the present invention, a number of fractions is determined to make time for completely sending all the fractionated data in each group be under a sending completion allowable time that is previously set for each group.

In accordance with an aspect of the present invention, data stored by a storage means is fractionated and sent in multiple cycles on the basis of a group of the data at every sending interval, instead of being sent all at once. In such a case, data sending operation of data in each group is completed at the time showed by sending intervals×a number of fractions. Thus, it is possible to efficiently send data which does not require being updated frequently, by changing a data sending completion interval based on an interval for updating the data, instead of sending the data at every sending interval. In addition, it is possible to reduce data amounts sent at one data sending operation, by fractionating and sending data in multiple cycles on the basis of a group of the data at every sending interval. Therefore, it is possible to reduce a duty for data communication among sending apparatuses. Furthermore, it is possible to send and receive data steady even when a communication medium connects a sending apparatus to another sending apparatus and has a narrow allowable bandwidth, by fractionating, calibrating and then by sending the data.

In accordance with an aspect of the present invention, data synchronization can be completed cyclically before a sending completion allowable time elapses on the basis of a frequency that data of each group is required and a frequency that data of each group is updated. Therefore, it is possible to send data efficiently.

BRIEF DESCRIPTION OF THE DRAWINGS

The above and further objects and features of the invention will more fully be apparent from the following detailed description with accompanying drawings.

FIG. 3 is an explanation view schematically showing contents of data exchanged among distribution apparatuses of the communication system mounted on the motor vehicle according to the present embodiment.

FIG. 4A and FIG. 4B are explanation views showing an example of contents about delay allowable time for data transmitted between distribution apparatuses and ECUs.

FIG. 5 is an explanation view showing an example of data structure on a database provided to each distribution apparatus.

FIG. 8 is an explanation view showing an example of contents about the number of fractions and the number of data to be read out that are determined by a control unit of a distribution apparatus according to the present embodiment and that are then stored.

FIG. 10 is an explanation view schematically showing an example of contents about data that is fractionated by a control unit of a distribution apparatus according to the present embodiment on the basis of a classified group.

DESCRIPTION OF THE PREFERRED EMBODIMENTS

Hereinafter, an embodiment of the present invention is described in detail with reference to drawings. In the embodiment described below, a communication system according to the present invention is described in the context of a communication system that is applied to a LAN mounted on a motor vehicle such as a car and connected to a plurality of ECUs sending and receiving data.

Figure 1:
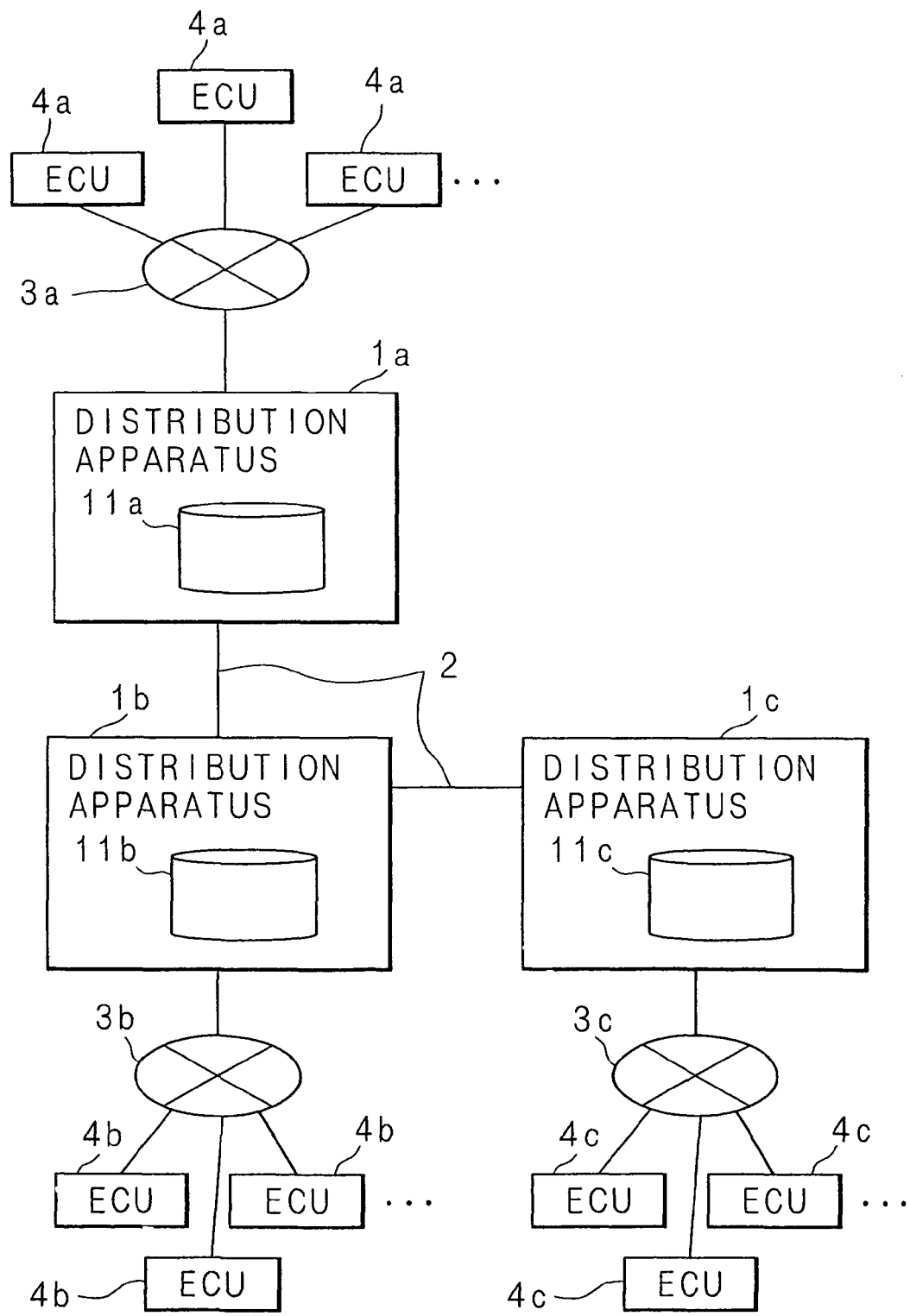
FIG. 1 is a block diagram showing components of the communication system mounted on a motor vehicle according to a present embodiment.

FIG. 1 is a block diagram showing components of the communication system mounted on a motor vehicle according to the embodiment. The communication system mounted on the vehicle is configured with: electronic control units (ECUs) 4a, 4a, . . . 4b, 4b, . . . 4c, 4c, . . . , as communication apparatuses, that are divided into some groups and respectively send and receive data; communication lines 3a, 3b, 3c connected to the ECUs 4a, 4a, . . . 4b, 4b, . . . 4c, 4c, . . . for each group to communicate the ECUs of each group; distribution apparatuses 1a, 1b, 1c that are connected to communication lines 3a, 3b, 3c, respectively, and distribute data to each of the ECUs 4a, 4a, . . . 4b, 4b, . . . , 4c, 4c, . . . ; and a communication line 2 connecting the distribution apparatuses 1a, 1b, 1c together. The communication system mounted on the vehicle of the embodiment is a trunking type network in which the distribution apparatuses 1a, 1b, 1c are connected to the communication line 2 being as one trunk and the ECUs 4a, 4a, . . . 4b, 4b, . . . 4c, 4c, . . . are divided into some groups through the distribution apparatuses 1a, 1b, 1c.

While the distribution apparatuses 1a, 1b, 1c are connected with each other through the communication line 2, the connection architecture is a daisy chain topology in the present embodiment. While the distribution apparatuses 1a, 1b, 1c are connected with the ECUs 4a, 4a, . . . 4b, 4b, . . . 4c, 4c, . . . through the communication lines 3a, 3b, 3c, the connection architecture may be a bus topology, star topology, daisy chain topology or the like.

Each of the distribution apparatuses 1a, 1b, 1c includes a storage area, working as a database 11a, 11b, 11c. Basically, the distribution apparatus 1a stores data, being sent from the ECUs 4a, 4a, . . . connected to the communication line 3a, into the database 11a, and sends data, being read out from the database 11a, toward the ECUs 4a, 4a, . . . .

The ECUs 4a, 4a, . . . 4b, 4b, . . . 4c, 4c, . . . can send data including numerical information of several physical quantities, such as measured values, computed values and control values. Furthermore, the ECUs 4a, 4a, . . . 4b, 4b, . . . 4c, 4c, . . . can control an engine, brake or the like, with utilizing a microcomputer. For example, an ECU 4a is connected with a sensor (not shown) for detecting rotation speeds of wheels (wheel speed), and works as an antilock brake system (ABS). The ECU 4a controls the brake in accordance with the wheel speed detected through the sensor during braking time of the car, and sends data including measured values of the wheel speed toward the distribution apparatus 1a.

Each ECU 4a, 4a, . . . 4b, 4b, . . . 4c, 4c, . . . sends, to a corresponding distribution apparatus 1a, 1b, 1c, data based on a function described above. Each distribution apparatus stores data sent from an ECU connected to said each distribution apparatus onto own database. Thus, each distribution apparatus 1a, 1b, 1c has data to be stored on own database 11a, 11b, 11c and to be updated, and a type of the data is different among the distribution apparatuses.

Therefore, data about the wheel speed sent from the ECU 4a is stored on the database 11a of the distribution apparatus 1a, and is updated by the distribution apparatus 1a every time the distribution apparatus 1a receives another data about the wheel speed. However, such data about the wheel speed may be utilized even by the ECUs 4b, 4b, . . . 4c, 4c, . . . which are respectively connected with another communication line 3b, 3c. Thus, the distribution apparatus 1a makes the data about the wheel speed be stored even on the databases 11b, 11c and makes the distribution apparatuses 1b, 1c send the data about the wheel speed to the ECUs 4b, 4b, . . . 4c, 4c, . . . . The distribution apparatuses 1a, 1b, 1c respectively send data, sent from the ECUs 4a, 4a, . . . 4b, 4b, . . . 4c, 4c, . . . , to another distribution apparatuses 1a, 1b, 1c, and then said another distribution apparatuses 1a, 1b, 1c respectively receive and store the data on own database 11a, 11b, 11c. Therefore, contents of databases 11a, 11b, 11c are synchronized with each other, and the ECUs 4a, 4a, . . . 4b, 4b, . . . 4c, 4c, . . . can utilize the same data even though the ECUs 4a, 4a, . . . 4b, 4b, . . . 4c, 4c, . . . are respectively connected with a different communication line 3a, 3b, 3c.

In addition, the distribution apparatuses 1a, 1b, 1c are respectively configured to send data to the ECUs 4a, 4a, . . . 4b, 4b, . . . , 4c, 4c, . . . after storing the data. Thus, it is possible to optimize timing for sending data from the distribution apparatuses 1a, 1b, 1c to the ECUs 4a, 4a, . . . 4b, 4b, . . . 4c, 4c, . . . on the basis of functions performed by the ECUs 4a, 4a, . . . 4b, 4b, . . . 4c, 4c, . . . . Furthermore, it is possible to send data, from the distribution apparatuses 1a, 1b, 1c, in combination with another data on the basis of functions performed by the ECUs 4a, 4a, . . . 4b, 4b, . . . 4c, 4c, . . . . Moreover, it is possible to send data, as appropriate, after the distribution apparatuses 1a, 1b, 1c performs calculations for the data. Therefore, it is possible to send data efficiently from the distribution apparatuses 1a, 1b, 1c and to reduce duties for data communication on the communication lines 3a, 3b, 3c.

Figure 2:
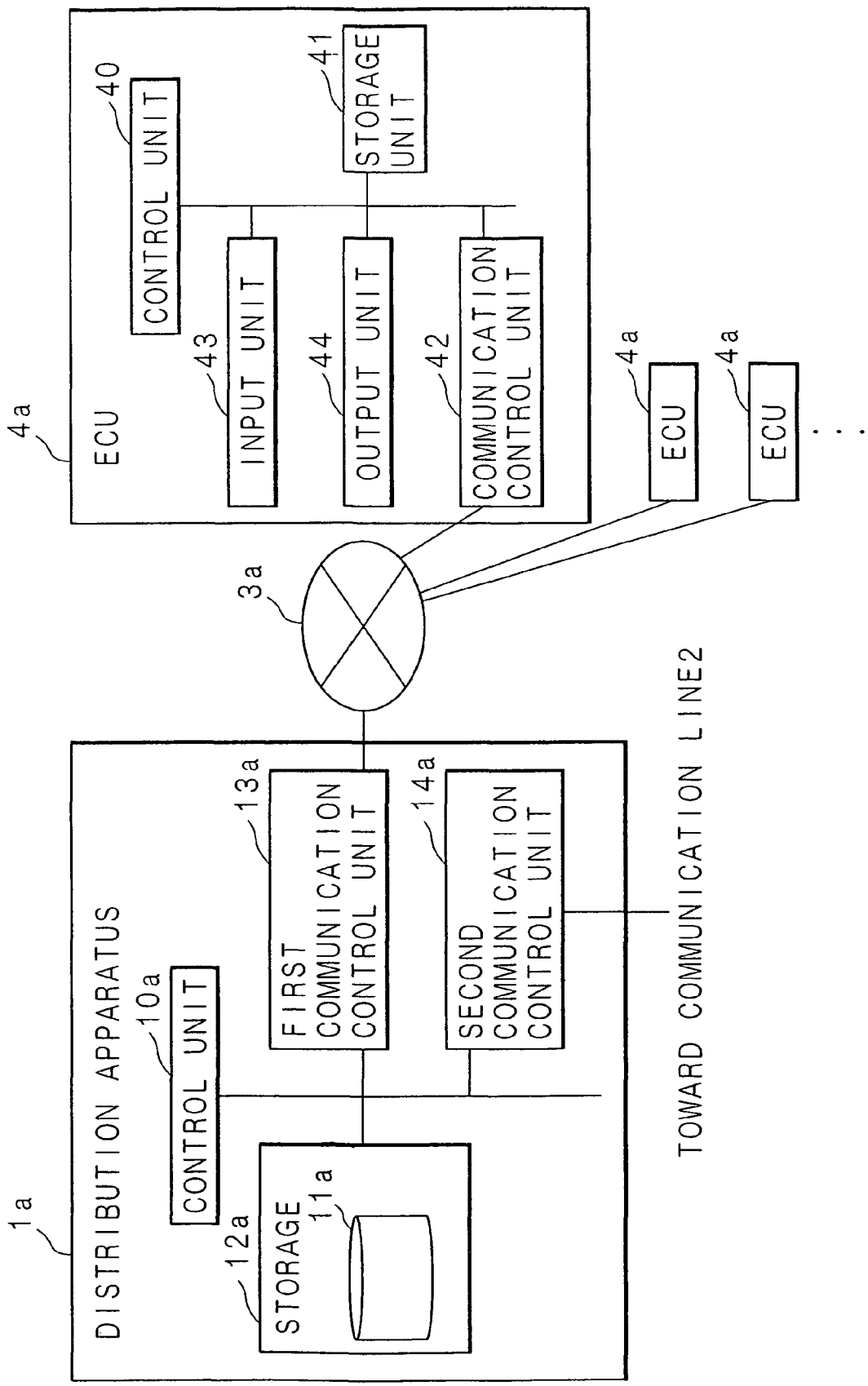
FIG. 2 is a block diagram showing inner components of a distribution apparatus and an ECU included in the communication system mounted on the motor vehicle according to the present embodiment.

FIG. 2 is a block diagram showing inner components of the distribution apparatuses 1a, 1b, 1c and the ECUs 4a, 4a, . . . 4b, 4b, . . . , 4c, 4c, . . . , included in the communication system mounted on the motor vehicle according to the present embodiment.

The distribution apparatus 1a includes: a control unit 10a that controls each component described bellow; storage 12a utilizing volatile memory; first communication control unit 13a connected to a communication line 3a; and a second communication control unit 14a connected to a communication line 2. The other distribution apparatuses 1b, 1c will not be described in detail, because having similar inner components as those of distribution apparatus 1a.

The control unit 10a is supplied with electric power from an electric power supply (not shown), such as an alternator or battery mounted on the motor vehicle, reads out a control program stored in nonvolatile inner memory (not shown), and executes the control program in order to control each component.

The storage unit 12a keeps a storage area for the database 11a storing data received from the ECUs 4a, 4a, . . . by the control unit 10a. The control unit 10a picks up, for each data type such as "wheel speed", specific measured values, computed values and control values from the received data and stores in the database 11a.

The first communication control unit 13a is connected with the ECUs 4a, 4a, . . . via the communication line 3a, and implements data transmission with the ECUs 4a, 4a, . . . . The control unit 10a receives data from the ECUs 4a, 4a, . . . and sends data to the ECUs 4a, 4a, . . . through the first communication control unit 13a.

The second communication control unit 14a is connected with the other distribution apparatuses 1b, 1c via the communication line 2, and implements data transmission with the distribution apparatuses 1b, 1c. The control unit 10a sends data being read out from the database 11a toward the other distribution apparatuses 1b, 1c through the second communication control unit 16a. In addition, the control unit 10a receives data being sent from the other distribution apparatuses 1b, 1c through the second communication control unit 16a.

The ECU 4a includes: a control unit 40 that controls each component described bellow; storage unit 41 utilizing nonvolatile memory; communication control unit 42 connected to the communication line 3a; input unit 43 that inputs a signal from a sensor (not shown); and an output unit 44 that outputs a control signal to an object device to be controlled (not shown). Other ECUs 4b, 4c will not be described in detail, because having similar components as those of ECU 4a. Anyway, the input unit 43 or the output unit 44 may be alternatively provided to one or more ECUs among the ECUs 4a, 4b, 4c.

The control unit 40 of the ECU 4a is supplied with electric power from an electric power supply (not shown), such as an alternator or battery mounted on the motor vehicle, detects a signal representing measured values being sent from the sensor (not shown) which is connected to the ECU 4a through the input unit 43, and sends a control signal toward the object device to be controlled which is connected to the ECU 4a through the output unit 44.

The storage unit 41 temporally stores several information generated during the operation of the control unit 40 or, for example, measured values represented by a signal being input from a sensor (not shown).

The communication control unit 42 has a network controller chip or network control function and implements communicating with the communication line 3a. The control unit 40 of the ECU 4a detects a signal coming from a sensor (not shown) periodically, for example every microsecond, and sends data including numerical information of physical quantities represented by the detected signal through the communication control unit 42. Further, the control unit 40 of the ECU 4a receives data being sent from the distribution apparatus 1a through the communication control unit 42.

It will be described about a procedure of the distribution apparatuses 1a, 1b, 1c for sending; receiving and exchanging data in order to synchronize contents of databases 11a, 11b, 11c, in the communication system mounted on the motor vehicle having such a configuration described above.

FIG. 3 is an explanation view schematically showing contents of data exchanged among distribution apparatuses 1a, 1b, 1c of the communication system mounted on the motor vehicle according to the present embodiment. In the explanation view of FIG. 3, contents of a clump data are shown that is sent and received by a distribution apparatus at each time point, as a horizontal axis represents elapsed time. Each rectangle shown by the explanation view of FIG. 3 represents data that belong to a data category being read out from the database 11a; 11b, 11c, and characters "A", "B" and "C" in the rectangles respectively represent data categories whose data are updated by the distribution apparatuses 1a, 1b, 1c.

Firstly, each distribution apparatus 1a, 1b, 1c basically reads out data that belong to data categories from a database 11a, 11b, 11c and sends the data to another distribution apparatus 1a, 1b, 1c, at a predetermined sending interval. In the present embodiment, the sending interval is, for example, 200 milliseconds.

As described above, the distribution apparatuses 1a, 1b, 1c according to the present embodiment are connected in the daisy chain topology. Thus, when a synchronization process is performed firstly from the distribution apparatus 1a as shown by the explanation view of FIG. 3, the distribution apparatus 1a sends a clump of data that belong to plural data categories, towards the distribution apparatus 1b at every sending interval, which are read out from the database 11a. At that time, data that belong to a data category "A" among data belonging to said plural data categories is updated to have new data values, while the data that belong to a data category "A" are data to be updated by the distribution apparatus 1a in the clump of data belonging to plural data categories sent from the distribution apparatus 1a to the distribution apparatus 1b. The distribution apparatus 1b then receives the clump of data from the distribution apparatus 1a. In addition, the distribution apparatus 1b reads out data belonging to a data category "B" from own database 11b, adds the data belonging to the data category "B" onto the clump of data received from the distribution apparatus 1a, and then sends the clump of data including added data towards the distribution apparatus 1c. During that process, the distribution apparatus 1b does not add any data within a region for data belonging to the data category "A" that is updated by the distribution apparatus 1a. The distribution apparatus 1c then receives the clump of data from the distribution apparatus 1b. In addition, the distribution apparatus 1c reads out data belonging to a data category "C" from own database 11c, adds the data belonging to the data category "C" onto the clump of data received from the distribution apparatus 1b. Thus, the data belonging to the plural data categories are updated to have new data values, while a clump of such data is sent from the distribution apparatus 1a to the distribution apparatus 1b and then from the distribution apparatus 1b to the distribution apparatus 1c and stored on the databases 11a, 11b, 11c.

The distribution apparatus 1c then updates own database 11c on the basis of the clump of data including the data belonging to the data category "C" being read out from own database 11c. At that process, the distribution apparatus 1c may read out data belonging to data categories "A" and "B" from the clump of data including updated data, while the data belonging to data categories "A" and "B" are data to be updated by the distribution apparatuses 1a, 1b. Alternatively, the distribution apparatus 1c may reads out data, before adding data being read out from own database 11c and belonging to the data category "C" onto the clump of data, from regions for data categories "A" and "B" whose data are updated by the distribution apparatus 1a, 1b, and then writes the data being read out from the regions for data categories "A" and "B" onto own database 11c. The distribution apparatus 1c then sends the clump of data back to the distribution apparatus 1b, while data belonging to each category has new data values based on each database 11a, 11b, 11c in the clump of data. The distribution apparatus 1b updates own database 11b based on the clump of data received from the distribution apparatus 1c, and then sends the clump of data including updated data to the distribution apparatus 1a. The distribution apparatus 1a updates own database 11a based on the clump of data received from the distribution apparatus 1b.

The distribution apparatuses 1a, 1b, 1c perform sending and receiving operations of such clump of data described in the explanation view of FIG. 3, at every sending interval 200 milliseconds.

The databases 11a, 11b, 11c stores data to be sent towards the ECUs 4a, 4a, . . . , 4b, 4b, . . . , 4c, 4c, . . . . There are many types of data in the data stored by the databases 11a, 11b, 11c. For example, some data should be updated at every 500 milliseconds interval, some data should be updated at every 3 seconds interval, and the like. These intervals depends on operations performed by the ECUs 4a, 4a, . . . , 4b, 4b, . . . , 4c, 4c, . . . . For instance, data about wheel speed is required to be updated at every 500 milliseconds interval, and data about temperature within the motor vehicle is enough to be updated at every 3 seconds interval.

It should be noted that, when the distribution apparatuses 1a, 1b, 1c send whole the clump of data including read data as shown in the explanation view of FIG. 3, it happens to send even such data enough to be updated at every 3 seconds interval, despite of failing to be updated, towards each distribution apparatus 1a, 1b, 1c at every sending interval in order to synchronize. Thus, that configuration may utilize extra communication bandwidth of the communication line 2 that connects distribution apparatuses 1a, 1b, 1c to each other.

The distribution apparatuses 1a, 1b, 1c according to the present embodiment classify data stored on the databases 11a, 11b, 11c into groups on the basis of delay allowable time that consider sending data from the ECUs 4a, 4, . . . , 4b, 4b, . . . 4c, 4c, . . . to each distribution apparatus 1a, 1b, 1c, performing synchronization among the distribution apparatuses 1a, 1b, 1c and then sending back to the ECUs 4a, 4, . . . , 4b, 4b, . . . 4c, 4c, . . . . Each data should be sent from the ECUs 4a, 4, . . . , 4b, 4b, . . . 4c, 4c, . . . and sent back to the ECUs 4a, 4, . . . , 4b, 4b, . . . 4c, 4c, . . . through each distribution apparatus 1a, 1b, 1c, within corresponding delay allowable time. Thus, the distribution apparatuses 1a, 1b, 1c fractionate a clump of data whose delay allowable time is relatively longer into pieces of data, and send the piece of data in multiple cycles, instead of sending whole clump of data whose delay allowable time is relatively longer at every sending interval for the synchronization.

FIG. 4A and FIG. 4B are explanation views showing an example of contents about delay allowable time for data transmitted between the distribution apparatuses 1a, 1, 1c and the ECUs 4a, 4a, . . . , 4b, 4b, . . . , 4c, 4c, . . . FIG. 4A shows that delay allowable time for each data is associated with a group generated by the classification based on the delay allowable time. FIG. 4B shows a number of data classified into each group as shown in FIG. 4(A).

As shown in FIG. 4A, there are many types of delay allowable time, while each delay allowable time is based on data. In the explanation view of FIG. 4A, "500 milliseconds" of "data 1" is the shortest delay allowable time. In view of required time and delay possibility for sending data from each ECU 4a, 4a, . . . , 4b, 4b, . . . , 4c, 4c, . . . to distribution apparatuses 1a, 1b, 1c and from distribution apparatuses 1a, 1b, 1c to each ECU 4a, 4a, . . . , 4b, 4b, . . . , 4c, 4c, . . . , the data 1 should be sent at every sending interval 200 milliseconds in order to perform synchronization. In a case of sending all data at once in order to synchronize, all data are necessary to be sent at the shortest delay allowable time for said all data.

However, data stored on the database 11a, 11b, 11c are classified into groups in the present embodiment as described above. In the example of contents shown in FIG. 4A, data are classified into 3 groups "X", "Y" and "Z". Data classified into "X" group have delay allowable time "500 milliseconds", data classified into "Y" group have delay allowable time "1000 milliseconds", and data classified into "Z" group have delay allowable time "3000 milliseconds". In the example of contents shown in FIG. 4A, data having delay allowable time less than "1000 milliseconds" are classified into the group "X", data having delay allowable time no less than "1000 milliseconds" and less than "3000 milliseconds" are classified into the group "Y", and data having delay allowable time no less than "3000 milliseconds" are classified into the group "Z".

FIG. 4B shows that "20" data are classified into the group "X" whose delay allowable time is "500 milliseconds", "35" data are classified into the group "Y" whose delay allowable time is "1000 milliseconds", and that "45" data are classified into the group "Z" whose delay allowable time is "3000 milliseconds", among "100" data stored on the database 11a, 11b, 11c.

The databases 11a, 11b, 11c may be configured to previously have data structures that list data in an order as shown in FIG. 4A. FIG. 5 is an explanation view showing an example of data structure on a database provided to each distribution apparatus 1a, 1b, 1c. The explanation view of FIG. 5 shows that data are listed, in the order of group "X", group "Y", and then group "Z", on the databases 11a, 11b, 11c within storages 12a, 12b, 12c of the distribution apparatuses 1a, 1b, 1c. Because the databases 11a, 11b, 11c are configured as shown in the explanation view of FIG. 5, the control units 10a, 10b, 10c of the distribution apparatuses 1a, 1b, 1c can easily read out data classified into each group, by storing address information of first data in each group on the databases 11a, 11b, 11c and storing data amount (total data size) of each group on the databases 11a, 11b, 11c.

For classifying each data into a group, the storages 12a, 12b, 12c may previously store group information as shown in the explanation view of FIG. 4A. Alternatively, the databases 11a, 11b, 11c may be previously fractionated into regions for groups, as shown in the explanation view of FIG. 5. However, the present invention is not limited to those configurations.

The control unit 10a of the distribution apparatus 1a may dynamically perform such operations for classifying each data into a group.

Figure 6:
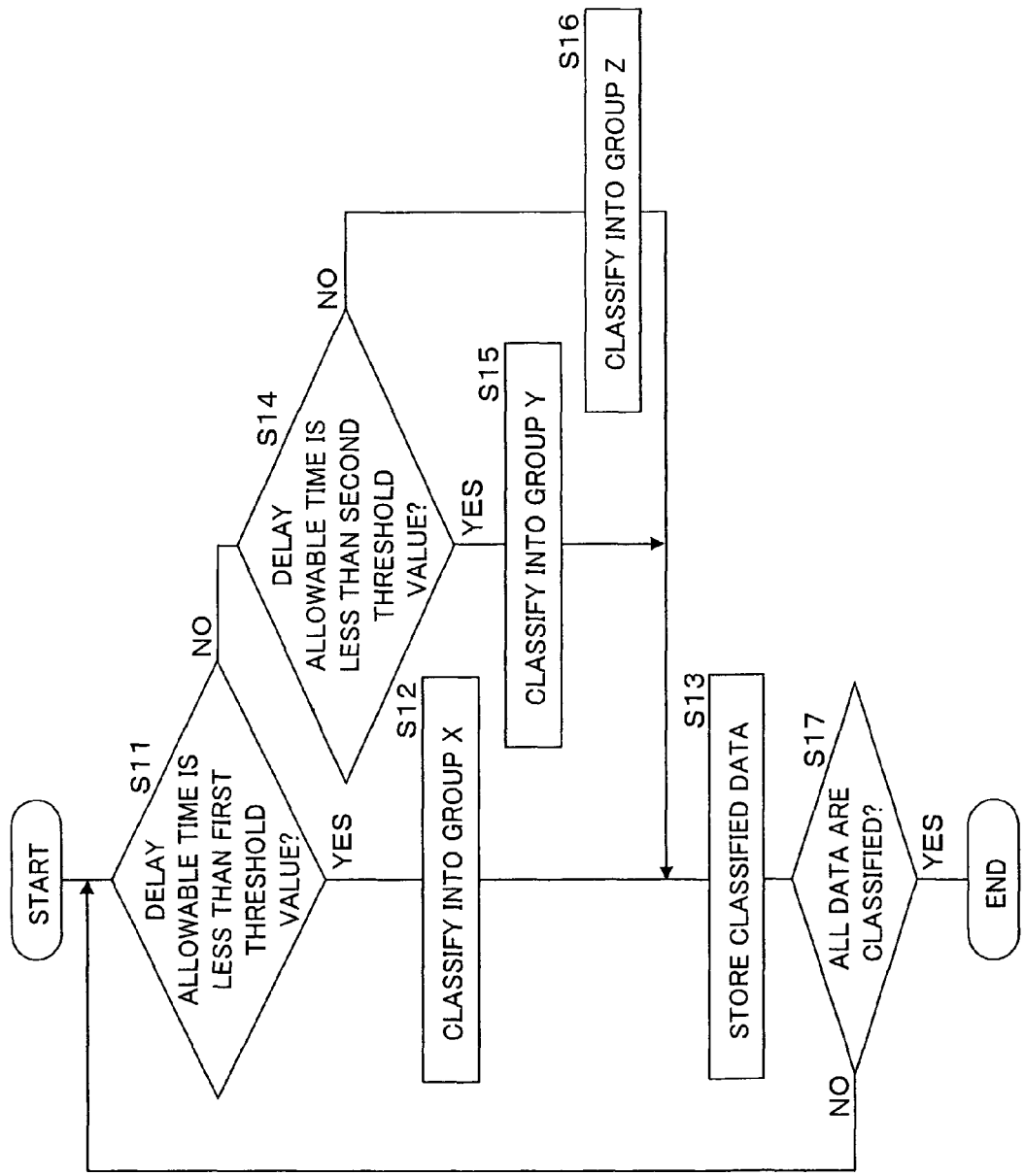
FIG. 6 is a flowchart showing an example of a procedure that data is classified into a group by a control unit of a distribution apparatus according to the present embodiment.

FIG. 6 is a flowchart showing an example of a procedure that data is classified into a group by the control unit 10a of the distribution apparatus 1a according to the present embodiment.

The control unit 10a of the distribution apparatus 1a determines whether delay allowable time being set for data is less than a first threshold value "1000 milliseconds" or not (step S11). When having determined that the delay allowable time being set for the data is less than the first threshold value (S11: YES), the control unit 10a classifies the data into the group "X" that relates data having a delay allowable time shortest of all groups (step S12), and then make the classified data be stored in association with the group "X" (step S13).

When having determined that the delay allowable time being set for the data is no less than the first threshold value (S11: NO), the control unit 10a determines whether the delay allowable time for the data is less than a second threshold value "3000 milliseconds" (step S14). When having determined that the delay allowable time for the data is less than the second threshold value (S14: YES), the control unit 10a classifies the data into the group "Y" that relates data having the first threshold value as the delay allowable time (step S15), and then make the classified data being stored in association with the group "Y" (step S13).

When having determined that the delay allowable time being set for the data is no less than the first threshold value (S11: NO), the control unit 10a classifies the data into the group "Z" that relates data having the second threshold value as the delay allowable time (step S16), and then make the classified data being stored in association with the group "Z" (step S13).

The control unit 10a then determines whether all data are classified or not (step S17). When having determined that all data are still not classified (S17: NO), the control unit 10a returns the procedure to the step S11 and starts classifying another data. When having determined that all data are classified (S17: YES), the control unit 10a terminates the procedure.

The control unit 10a of the distribution apparatus 1a performs the procedure shown by the flowchart of FIG. 6, and thus, the procedure results in obtaining information about data in association with groups as shown in FIG. 4A. Alternatively, the procedure shown by the flowchart of FIG. 6 may result in storing on the storage 12a the address of the first data in each group on the database 11a. The control units 10b, 10c may perform procedures similar to the procedure shown by the flowchart of FIG. 6, or the distribution apparatus 1a may send obtained information to the distribution apparatuses 1b, 1c.

Next, it will be described about procedures that the distribution apparatuses 1a, 1b, 1c read out, from databases 11a, 11b, 11c, data that is classified into each group as described above. While the sending interval is 200 milliseconds, the delay allowable time of data classified into group "X" is "500 milliseconds", the delay allowable time of data classified into group "Y" is "1000 milliseconds" and the delay allowable time of data classified into group "Z" is "3000 milliseconds". The distribution apparatuses 1a, 1b, 1c respectively fractionate a clump of data based on each group that the data are classified into, and the distribution apparatuses 1a, 1b, 1c respectively send a piece of fractionated clump data in multiple cycles.

While clump data per group is fractionated, the number of fractions d is determined on the basis of an equation (1).

$$(\text{number of fractions } d+1) \times (\text{sending interval}) + (\text{sending delay-expected time from each ECU } 4a, 4a, \ldots 4b, 4b, \ldots 4c, 4c, \ldots) + (\text{sending delay-expected time to each ECU } 4a, 4a, \ldots 4b, 4b, \ldots 4c, 4c, \ldots) \leq (\text{delay allowable time for each group}) \quad (1):$$

Assume that "50 milliseconds" is applied as the sending delay-expected time between the distribution apparatuses $1a$, $1b$, $1c$ and the ECUs $4a, 4a, \ldots 4b, 4b, \ldots 4c, 4c, \ldots$ in the communication system mounted on the motor vehicle according to the present embodiment. In such an assumption, it is possible to determine each number of fractions dx, dy and dz for fractionating data of each group "X", "Y" and "Z" by equations (2)-(7).

$$(dx+1) \times 200 + 50 + 50 \leq 500 \quad (2):$$

$$dx \leq 1 \quad (3):$$

$$(dy+1) \times 200 + 50 + 50 \leq 1000 \quad (4):$$

$$dy \leq 3.5 \quad (5):$$

$$(dz+1) \times 200 + 50 + 50 \leq 3000 \quad (6):$$

$$dz \leq 13.5 \quad (7):$$

In conformity with the equations (3), (5) and (7), the number of tractions dx for the group "X" is determined to be "1". In addition, the number of tractions dy for the group "Y" is determined to be, for example, "3", and the number of tractions dz for the group "Z" is determined to be, for example, "10". Those numbers of fractions may be determined to be maximum integers in conformity with those equations. In the present embodiment, the number of fractions dz for data classified into the group "Z" is configured to be "10" even when those equations lead a number more than "10".

When having determined the numbers of fractions dx, dy, dz for respective groups, the control units $10a$, $10b$, $10c$ of the distribution apparatuses $1a$, $1b$, $1c$ calculate numbers of data to be read out, at every sending interval, which are generated from the fractionated clump data for respective group by numbers of fractions dx, dy, dz.

Figure 7:
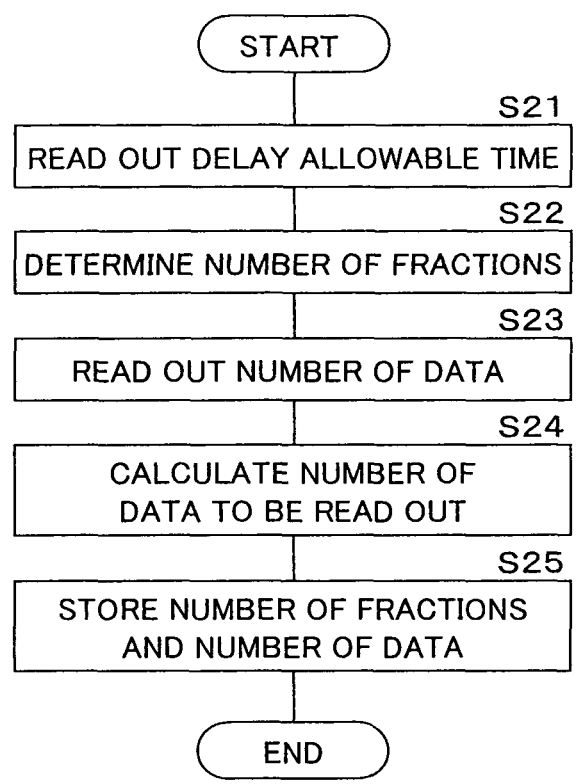
FIG. 7 is a flowchart showing a procedure that a number of fractions for each group is determined and a number of data to be read out is calculated by a control unit of a distribution apparatus according to the present embodiment.

FIG. 7 is a flowchart showing a procedure that a number of fractions for each group is determined and a number of data to be read out is calculated by the control unit $10a$ of the distribution apparatus $1a$ according to the present embodiment. The control unit $10a$ of the distribution apparatus $1a$ performs a procedure described below after reading out information shown in FIG. 4B from the storage $12a$. The control units $10b$, $10c$ may be configured to perform procedures similar to the procedure performed by the control unit $10a$, or may be configured to obtain information that is determined and calculated by the control unit $10a$ of the distribution apparatus $1a$.

The control unit $10a$ of the distribution apparatus $1a$ reads out delay allowable time for each group (step S21), and determines a number of fractions based on the equation (1) described above (step S22). The control unit $10a$ reads out a number of data classified into each group (step S23), divides the read number of data by the determined number of fractions (when the divided number is configured with an integer and a decimal number, the integer plus one is applied to as the divided number) for calculating the number of data to be read out at data sending operation (step S24). The control unit $10a$ stores the determined number of fractions and the calculated number of data on the storage $12a$ (step S25) and terminates the procedure.

FIG. 8 is an explanation view showing an example of contents about the number of fractions and the number of data to be read out that are determined by the each control unit $10a$, $10b$, $10c$ of the distribution apparatus $1a$, $1b$, $1c$ according to the present embodiment and that are then stored. The example of contents showed in the explanation view of FIG. 8 corresponds to the example of contents of FIG. 4B, and is the result that the procedure shown in the flowchart of FIG. 7 is performed.

In the example of contents showed by the explanation view of FIG. 8, the number of data classified into the group "X" is "20" and then the number of fractions dx is determined to be "1". Thus, the example of contents shows that control units $10a$, $10b$, $10c$ respectively read out all data among "20" data classified into the group "X" at every sending interval. In addition, the number of data classified into the group "Y" is "35" and then the number of fractions dy is determined to be "3". Thus, the example of contents shows that control units $10a$, $10b$, $10c$ respectively read out "12" data among "35" data classified into the group "Y" at every sending interval. Similarly, the number of data classified into the group "Z" is "45" and then the number of fractions dz is determined to be "10". Thus, the example of contents shows that control units $10a$, $10b$, $10c$ respectively read out "5" data among "45" data classified into the group "Z" at every sending interval. While each control unit $10a$, $10b$, $10c$ cannot read out the calculated number of data classified into groups "Y" and "Z" at the last sending interval, each control unit $10a$, $10b$, $10c$ is configured to read out all the residual data at the last sending interval.

If data on the databases $11a$, $11b$, $11c$ are sent and received among the distribution apparatuses $1a$, $1b$, $1c$ without being classified and fractionated, the "100 (=20+35+45)" number of data should be sent and received. In other words, "100" data should be sent to the communication line 2 at every sending interval. However, in the present invention, each database $11a$, $11b$, $11c$ stores data, the data are classified into groups, and then a clump of data for each group is fractionated to be sent. Thus, it is enough to send "37 (=20+12+5) data at one sending interval. Therefore, it is possible to reduce a duty for data communication in the communication line 2.

The present embodiment is illustrated that the control units $10a$, $10b$, $10c$ of the distribution apparatuses $1a$, $1b$, $1c$ respectively determine the numbers of fractions dx, dy, dz based on the equation (1), and that information as shown in the explanation of FIG. 8 are stored. However, the present invention is not limited to the illustration. The numbers of fractions dx, dy, dz may be previously stored respectively on the storages $12a$, $12b$, $12c$ with the information shown in the explanation views of FIG. 4A and FIG. 4B.

Next, it will be described about a procedure for sending data among the distribution apparatuses $1a$, $1b$, $1c$. The control unit $10a$ of the distribution apparatus $1a$ according to the present embodiment cyclically selects for each group a piece of data generated from the fractionated clump data as shown in the explanation view of FIG. 8 at every sending interval, and then sends the selected piece of data.

Figure 9:
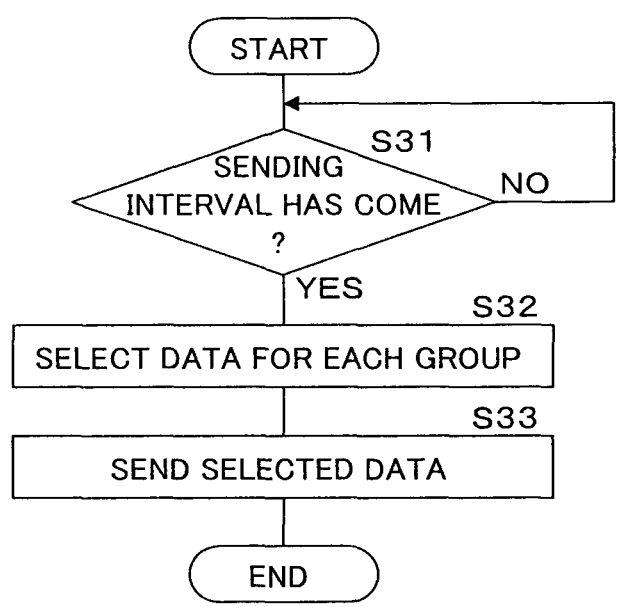
FIG. 9 is a flowchart showing a procedure that a control unit of a distribution apparatus according to the present embodiment reads out data from a database and sends the data to another distribution apparatus in order to synchronize.

FIG. 9 is a flowchart showing a procedure that the control unit $10a$ of the distribution apparatus $1a$ according to the present embodiment reads out data from the database $11a$ and sends the data to other distribution apparatuses $1b$, $1c$ in order to synchronize. In addition, the control units $10b$, $10c$ of the distribution apparatuses $1b$, $1c$ also perform procedures similar to the procedure performed by the distribution apparatus 1a. Thus, the procedures performed by the distribution apparatuses 1b, 1c are not described in detail.

The control unit 10a of the distribution apparatus 1a determines whether a following sending interval has come or not (step S31). When having determined that the following sending interval has not come yet (S31: NO), the control unit 10a returns the procedure to the step S31 and waits until having determined that the following sending interval has come.

When having determined that the following sending interval has come (S31: YES), the control unit 10a selects a piece of data generated from the fractionated clump of data on the basis of the number of fractions, for each group that data on the database 11a are classified into (step S32). At that time, the control unit 10a selects data based on the number of data to be read out for one sending operation, while the number of data is calculated by determining the number of fractions dx as shown in the explanation view of FIG. 8.

The control unit 10a then makes the second communication control unit 14a send data selected for each group to other distribution apparatuses 1b, 1c, and terminates the data sending operation (step S33).

The control units 10a, 10b, 10c of the distribution apparatuses 1a, 1b, 1c according to the present embodiment cyclically perform the procedure shown in the flowchart of FIG. 9 at every sending interval 200 milliseconds.

FIG. 10 is an explanation view schematically showing an example of contents about data that is fractionated by each control unit 10a, 10b, 10c of the distribution apparatus 1a, 1b, 1c according to the present embodiment on the basis of a classified group. The explanation view of FIG. 10 corresponds to a case that data structures of databases 11a, 11b, 11c are configured on the basis of groups as shown in the explanation view of FIG. 5. In the explanation view of FIG. 10, a storage region for all data classified into the group "X" is fractionated into pieces of regions, as well as a storage region for all data classified into the group "Y" and a storage region for all data classified into the group "Z". Thus, the explanation view of FIG. 10 shows that a mass of clump data is fractionated into. By the fractionation, each piece of region includes data whose number corresponds to the calculated number of data to be read out.

As shown in the explanation view of FIG. 10, the number of fractions dx is "1" for the data classified into the group "X" on the databases 11a, 11b, 11c. Thus, a clump of data classified into the group "X" is sent, all at once, at every sending interval 200 milliseconds without being fractionated into. The number of fractions dy is "3" for data classified into the group "Y". Thus, the region for the data classified into the group "Y" is fractionated into three pieces of regions: "Y0", "Y1" and "Y2". The number of fractions dz is "10" for data classified into the group "Z". Thus, the region for the data classified into the group "Z" is fractionated into ten pieces of regions: "Z0", "Z1", "Z2", "Z3", "Z4", "Z5", "Z6", "Z7", "Z8" and "Z9".

The control units 10a, 10b, 10c of the distribution apparatuses 1a, 1b, 1c may make address of the first data within the fractionated clump data for each group be stored by the databases 11a, 11b, 11c having data structures based on each group as shown in the explanation view of FIG. 10. Thus, the control units 10a, 10b, 10c of the distribution apparatuses 1a, 1b, 1c cyclically select the address of the first data within the fractionated clump data for each group, at the time for sending data. Therefore, it is possible to easily read out fractionated data for each group.

For example, the control unit 10a of the distribution apparatus 1a sends all data in the group "X", all data on the "Y0" region in the group "Y" and all data on the "Z0" region in the group "Z", at the first data sending operation. In addition, the control unit 10a sends all data in the group "X", all data on the "Y2" region in the group "Y" and all data on the "Z2" region in the group "Z", at the third data sending operation. The control unit 10a then sends all data in the group "X", all data on the "Y0" region in the group "Y" and all data on the "Z3" region in the group "Z", at the fourth data sending operation.

When having received a clump of data configured with all data in the group "X", all data on the "Y0" region in the group "Y" and with all data on the "Z0" region in the group "Z" that are sent from the distribution apparatus 1a, the distribution apparatus 1b writes in order to update, onto the received clump of data, data directly received from ECUs 4b, 4b, . . . among data classified into the group "X", "Y0" region of the group "Y" and the "Z0" region of the group "Z". Furthermore, the distribution apparatus 1b sends the written clump of data to the distribution apparatus 1c. The distribution apparatus 1c writes in order to update, onto the received clump of data, data directly received from ECUs 4c, 4c, . . . among data classified into the group "X", "Y0" region of the group "Y" and the "Z0" region of the group "Z", and sends the written clump of data back to the distribution apparatus 1b.

Thus, the distribution apparatuses 1a, 1b, 1c selects and sends fractionated data for each group at every sending interval. Therefore, it is possible to reduce data amounts to be sent at each sending interval in the configuration according to the present embodiment compared with the configuration that all data on the databases 11a, 11b, 11c are sent at each sending interval.

Figure 11A:
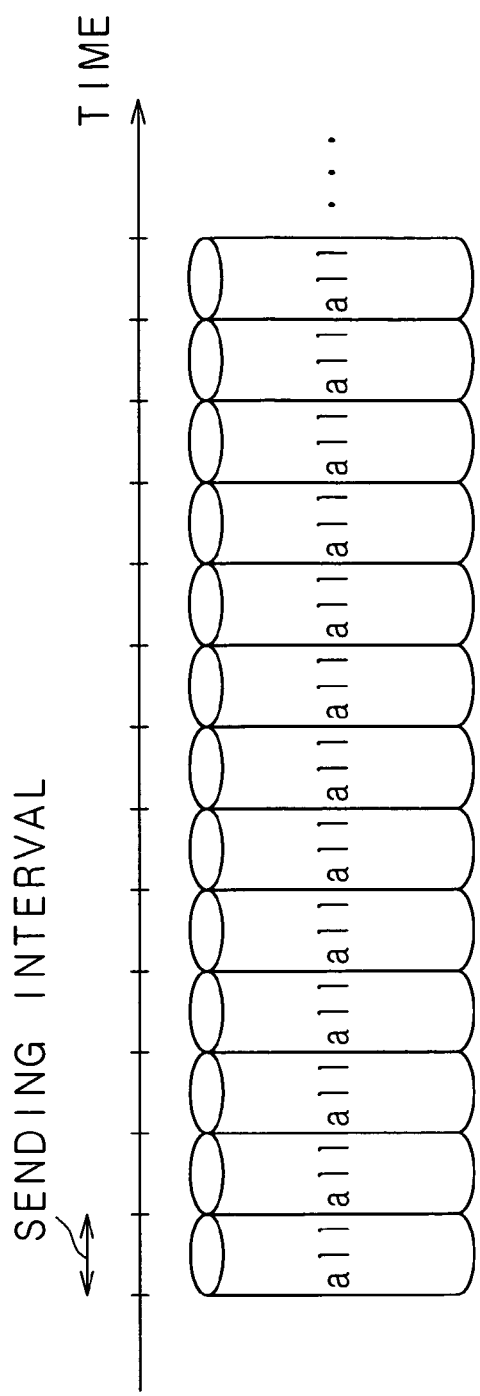
FIGS. 11A and 11B are schematic views showing data transmitted among distribution apparatuses according to the present embodiment in order to synchronize.
Figure 11B:
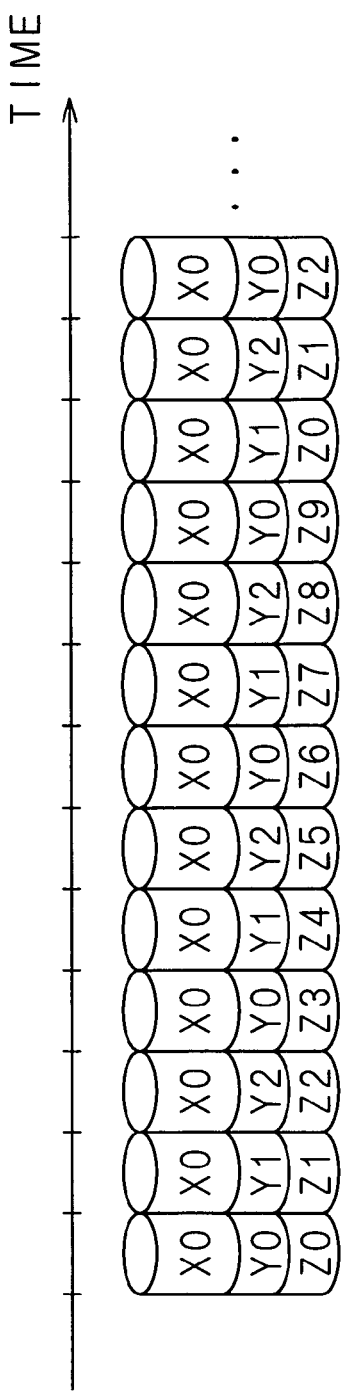

FIG. 11A and FIG. 11B are schematic views showing data transmitted among the distribution apparatuses 1a, 1b, 1c according to the present embodiment in order to synchronize. FIG. 11A shows a clump of data to be sent at every sending interval, in a case that all data stored on the databases 11a, 11b, 11c are sent at every sending interval. On the other hands, FIG. 11B shows a clump of data to be sent at every sending interval, in a case that data stored on the databases 11a, 11b, 11c are respectively classified into groups, the data classified into each group are fractionated, and then that the fractionated data are sent. In FIG. 11A and FIG. 11B horizontal axes represent elapsed time, as each scale of the horizontal axes indicates the sending interval 200 milliseconds.

In the case that all data stored on the databases 11a, 11b, 11c are sent as shown in FIG. 11A, all the data are sent and received among the distribution apparatuses 1a, 1b, 1c at every sending interval 200 milliseconds. The clump of data sent and received at every 200 milliseconds includes even the data that is enough to be updated at every 3 seconds and whose delay allowable time is 3000 milliseconds. In the case that all data are sent and received at every 200 milliseconds, extra data happens to be sent and received because such data whose delay allowable time is 3000 milliseconds is also sent and received.

On the other hands, in the case that data stored on the databases 11a, 11b, 11c are respectively classified into groups, the data classified into each group are fractionated by the number of fractions based on said each group, and then that a piece of the fractionated data for each group is sent in multiple cycles as shown in FIG. 11B, it is possible to reduce amounts of data sent and received among the distribution apparatuses 1a, 1b, 1c at each sending interval 200 milliseconds, in comparison with the case that all data are sent and received at each sending interval as shown in FIG. 11A. Therefore, it is possible to prevent from sending and receiving extra data in the communication line 2 and possible to reduce a duty for data communication in the communication line 2. Furthermore, the control units 10a, 10b, 10c of the distribution apparatuses 1a, 1b, 1c according to the present embodiment determine the numbers of fractions and calculate numbers of data to be read out at every sending interval, by simply dividing a number of data for each group by the number of fractions for said each group. Thus, it is possible to calibrate amounts of data sent and received among the distribution apparatuses 1a, 1b, 1c at every sending interval. Therefore, it is expected that data is sent and received stably with the communication line 2, even when the communication line 2 has a relative narrow communication bandwidth.

As shown in FIG. 11B, the control units 10a, 10b, 10c of the distribution apparatuses 1a, 1b, 1c according to the present embodiment are configured to determine the numbers of fractions and the number of data to be read out at every sending interval is calculated by the simple division of the number of data for each group by the number of fractions for said each group. Thus, it is possible to calibrate amounts of data sent and received among the distribution apparatuses 1a, 1b, 1c at every sending interval. However, the present invention is not limited to that configuration. It is desirable, but not essential, to calibrate amounts of data sent and received among the distribution apparatuses 1a, 1b, 1c at every sending interval. Instead, it is required to send data classified into each group at an interval under the delay allowable time, without sending and receiving data stored on the databases 11a, 11b, 11c all at once, and to reduce amounts of data sent and received.

Moreover, the number of fractions for data classified into each group is determined by the equation (1) to prevent the data from being sent at an interval over the sending delay allowable time for said each group. In the present embodiment, a clump of data of the group "Y" is sent in multi cycles and completed at the third sending interval. It means that all data of the group "Y" are completely sent at every 600 milliseconds (=200 milliseconds×3: i.e., time for three sending intervals). Therefore, all data of the group "Y" can be completely sent and received at every said interval 600 milliseconds that is enough for the delay allowable time "1000 milliseconds" even in consideration of time required for sending data from the ECUs 4a, 4a, ... 4b, 4b, ... 4c, 4c, ... to the distribution apparatuses 1a, 1b, 1c and from the distribution apparatuses 1a, 1b, 1c to the ECUs 4a, 4a, ... 4b, 4b, ... 4c, 4c, ... and delay time generated during the data sending operations.

Similarly, a clump of data of the group "Z" is fractionated into 10 pieces, sent in multi cycles and is completed at the tenth sending interval. It means that all data of the group "Z" are completely sent at every 2000 milliseconds (=200 milliseconds×10: i.e., time for ten sending intervals). Therefore, all data of the group "Z" can be completely sent and received at every said interval 2000 milliseconds that is enough for the delay allowable time "3000 milliseconds" for data classified into the group "Z".

As described above, the present invention can change the interval, which completes sending data for each group, within a range preventing the data from being sent over the sending delay allowable time, without sending all the data at every sending interval for the cyclical data sending operations. Thus, it is possible to reduce amounts of data sent at each sending interval. Therefore, the distribution apparatuses 1a, 1b, 1c can send and receive data efficiently, reduce amounts of data sent and received in the communication line 2 and can reduce a duty for data communication.

In the communication system according to the present embodiment, the distribution apparatuses 1a, 1b, 1c are illustrated to be connected with each other in a daisy chain topology. In addition, the procedure for sending and receiving data to synchronize among the distribution apparatuses 1a, 1b, 1c is illustrated that: the distribution apparatus 1a sends a clump of data to the distribution apparatus 1b; the distribution apparatus 1b receive the clump of data, writes update data onto a region for the distribution apparatus 1b among the received clump of data, and sends the written clump of data to the distribution apparatus 1c; the distribution apparatus 1c receives the clump of data, further writes update data onto a region for the distribution apparatus 1c among the received clump of data, and sends the written clump of data back to the distribution apparatus 1b; and the distribution apparatus 1b similarly sends the clump of data, received from the distribution apparatus 1c, back to the distribution apparatus 1a. However, the present invention is not limed to the procedure. With a configuration that the distribution apparatuses 1a, 1b, 1c are connected with each other in a bus topology, the distribution apparatuses 1a, 1b, 1c may respectively select, from the data stored on own databases 11a, 11b, 11c; a clump of data fractionated for each group and may sequentially send the selected clump of data to other distribution apparatuses 1a, 1b, 1c.

As this invention may be embodied in several forms without departing from the spirit of essential characteristics thereof, the present embodiment is therefore illustrative characteristics thereof, the present embodiment if therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data sending apparatus, comprising:
   a processor and a memory;
   a storage that stores a plurality of data;
   a sending unit that externally sends data stored by the storage at a predetermined interval;
   an update unit that updates data stored by the storage;
   a group classification unit that classifies the plurality of data stored by the storage into a plurality of groups;
   a data categorization unit that categorizes data belonging to each group classified by the group classification unit into data categories;
   a selection unit that selects a group from the plurality of groups classified by the group classification unit;
   a fraction unit that fractionates a clump of data belonging to the group selected by the selection unit into pieces of data, wherein
   the update unit updates data belonging to a predetermined data category categorized by the data categorization unit among data belonging to a group selected by the selection unit, at every said interval, and
   the sending unit sends a piece of data that is obtained by the fraction unit fractionating the clump of data which comprises data updated by the update unit, wherein the sending unit sends each piece of data at every said interval under a sending completion allowable time previously set for the group selected by the selection unit.

2. A data sending apparatus according to claim 1, wherein the sending unit cyclically sends a piece of data that is obtained by the fractionating fraction unit.

3. A data sending apparatus according to claim 1, wherein a number of fractions that the fraction unit fractionates the clump of data into the pieces of data prevents a total time of sending intervals based on the number of fractions and a total time of sending delay-expected time from being over the sending completion allowable time previously set for the group selected by the selection unit.

4. A data sending apparatus according to claim 1, wherein the data sending apparatus is a gateway apparatus mounted on a motor vehicle.

5. A data sending apparatus according to claim 4, wherein the group classification unit classifies, on the basis of functions provided to the motor vehicle, the plurality of data stored by the storage into the plurality of groups.

6. A data sending apparatus according to claim 5, further comprising:
a receiving unit that receives external data, wherein
the update unit updates data belonging to a data category corresponding to the data received by the receiving unit.

7. A sending method, with using a data sending apparatus having a storage that stores a plurality of data, for sending data stored by the storage at a predetermined sending interval to another data sending apparatus, comprising steps of:
classifying the plurality of data stored by the storage into a plurality of groups;
categorizing data belonging to each classified group into data categories;
selecting a group from the plurality of groups obtained by the classifying;
updating data belonging to a data category obtained by the categorizing, among data belonging to the group obtained by the selecting, at every said sending interval;
fractionating a clump of data belonging to the group obtained by the selecting into pieces of data; and
sending to said another data sending apparatus a piece of data generated from the fractionated clump of data that comprises the updated data, and sending each piece of data at every said interval under a sending completion allowable time previously set for the group selected.

8. A sending method according to claim 7, further comprising a step of:
performing cyclically the step of sending.

9. A sending method according to claim 7, further comprising a step of:
determining a number of fractions for fractionating the clump of data into the pieces of data to prevent a total time of sending intervals based on the number of fractions and a total time of sending delay-expected time from being over the sending completion allowable time previously set for the group obtained by the selection.

10. A sending method according to claim 7, further comprising a step of:
preparing gateway apparatuses mounted on a motor vehicle as the data sending apparatus and said another data sending apparatus.

11. A sending method according to claim 10, further comprising a step of:
preparing plural groups based on functions provided to the motor vehicle as the plurality of groups.

12. A sending method according to claim 11, further comprising steps of:
receiving data from an electronic control unit mounted on the motor vehicle; and
selecting data which belongs to a data category corresponding to data received from the electronic control unit, as data updated at the step of updating.

13. A data communication system, comprising:
a plurality of sending apparatuses, each of which externally sends data, wherein
each sending apparatus comprises:
a processor and a memory;
a receiving unit that receives data sent from another sending apparatus;
a storage that stores a plurality of data;
a sending unit that sends data stored by the storage to another sending apparatus at a predetermined interval;
an update unit that updates data stored by the storage;
a group classification unit that classifies the plurality of data stored by the storage into a plurality of groups;
a data categorization unit that categorizes data belonging to each group classified by the group classification unit into data categories;
a selection unit that selects a group from the plurality of groups classified by the group classification unit;
a fraction unit that fractionates a clump of data belonging to the group selected by the selection unit into pieces of data,
the update unit updates data belonging to a predetermined data category categorized by the data categorization unit among data belonging to a group selected by the selection unit, at every said interval,
the sending unit sends a piece of data that is obtained by the fraction unit fractionating the clump of data which comprises data updated by the update unit, wherein the sending unit sends each piece of data at every said interval under a sending completion allowable time previously set for the group selected by the selection unit, and
data contents stored by the storage are synchronized among the plurality of sending apparatuses.

14. A data communication system according to claim 13, wherein
the sending unit cyclically sends a piece of data that is obtained by the fractionating fraction unit.

15. A data communication system according to claim 13, wherein
a number of fractions that the fraction unit fractionates the clump of data into the pieces of data prevents a total time of sending intervals based on the number of fractions and a total time of sending delay-expected time from being over the sending completion allowable time previously set for the group selected by the selection unit.

16. A data communication system according to claim 13, wherein
the communication system is a system mounted on a motor vehicle, and
the plurality of sending apparatuses are gateways mounted on the motor vehicle.

17. A communication system according to claim 16, wherein
the group classification unit classifies, on the basis of functions provided to the motor vehicle, the plurality of data stored by the storage into the plurality of groups.

18. A communication system according to claim 17, further comprising:
a plurality of electronic control units connected to said each sending apparatus, wherein
the update unit updates data belonging to a data category corresponding to an electronic control unit connected to the update unit.

19. A data communication system according to claim 18, wherein
data received by the receiving unit is stored by the storage, and
data, which belongs to a data category without corresponding to data operated by an electronic control unit connected to the sending unit, is not updated in the piece of data sent by the sending unit.

20. A data communication system according to claim 19, wherein
data sent from each electronic control unit is sent back to said each electronic control unit after being updated for synchronization among the plurality of sending apparatuses, within the sending completion allowable time.

* * * * *